United States Patent [19]

Baker

[11] 4,117,916
[45] Oct. 3, 1978

[54] BEARING CARRIER FOR A CLUTCH RELEASE BEARING

[75] Inventor: Peter Frederick Baker, Conway, Great Britain

[73] Assignee: Quinton Hazell Limited, Colwyn Bay, England

[21] Appl. No.: 733,233

[22] Filed: Oct. 18, 1976

[30] Foreign Application Priority Data

Oct. 24, 1975 [GB] United Kingdom ............... 43742/75

[51] Int. Cl.$^2$ ...................... F16C 35/06; F16D 23/00
[52] U.S. Cl. .................................. 192/98; 192/110 B; 308/237 A
[58] Field of Search ............................ 192/98, 110 B; 308/237 R, 237 A, 95, 233, 232, 236

[56] References Cited

U.S. PATENT DOCUMENTS

| | | | |
|---|---|---|---|
| 2,278,663 | 4/1942 | Loeffler et al. | 192/110 |
| 2,465,558 | 3/1949 | Toth | 308/35 X |
| 2,620,243 | 12/1952 | Beatty, Jr. | 308/95 X |
| 3,631,954 | 1/1972 | Coaley | 192/98 |
| 3,805,934 | 4/1974 | Labadie | 192/110 B |
| 3,815,715 | 6/1974 | Maucher | 192/110 B X |
| 3,904,008 | 9/1975 | Sonnerat | 192/98 |
| 3,972,576 | 8/1976 | Hill | 308/237 |

FOREIGN PATENT DOCUMENTS 1,241,474  8/1971  United Kingdom ...................... 192/98

Primary Examiner—Kenneth W. Sprague
Assistant Examiner—Larry Jones
Attorney, Agent, or Firm—Klarquist, Sparkman, Campbell, Leigh, Hall & Whinston

[57] ABSTRACT

A clutch release bearing assembly comprising a clutch release bearing having inner and outer races with rolling elements therebetween, the inner race being carried on a bearing carrier which is slidably mounted on a drive element of the clutch and is engaged by a clutch control member whereby a clutch disengaging force is applied to the inner race and transmitted therefrom by the rolling elements, to the outer race and hence to the clutch mechanism the bearing carrier including a metal insert and a synthetic plastics part, the metal insert comprising a tubular portion and a flange portion, the tubular portion having on its external surface a seat portion which is adapted to engage and retain the inner race of the bearing and the bore of the tubular portion being adapted to surround a drive element of the clutch, the flange portion being adapted to provide a transverse abutment surface for engagement by the clutch operating means, the plastics part being moulded onto the insert so that relative movement between the insert and the plastics part is prevented and the plastics part providing a bearing for bearing engagement with the drive element while the seat portion of the insert is exposed.

8 Claims, 4 Drawing Figures

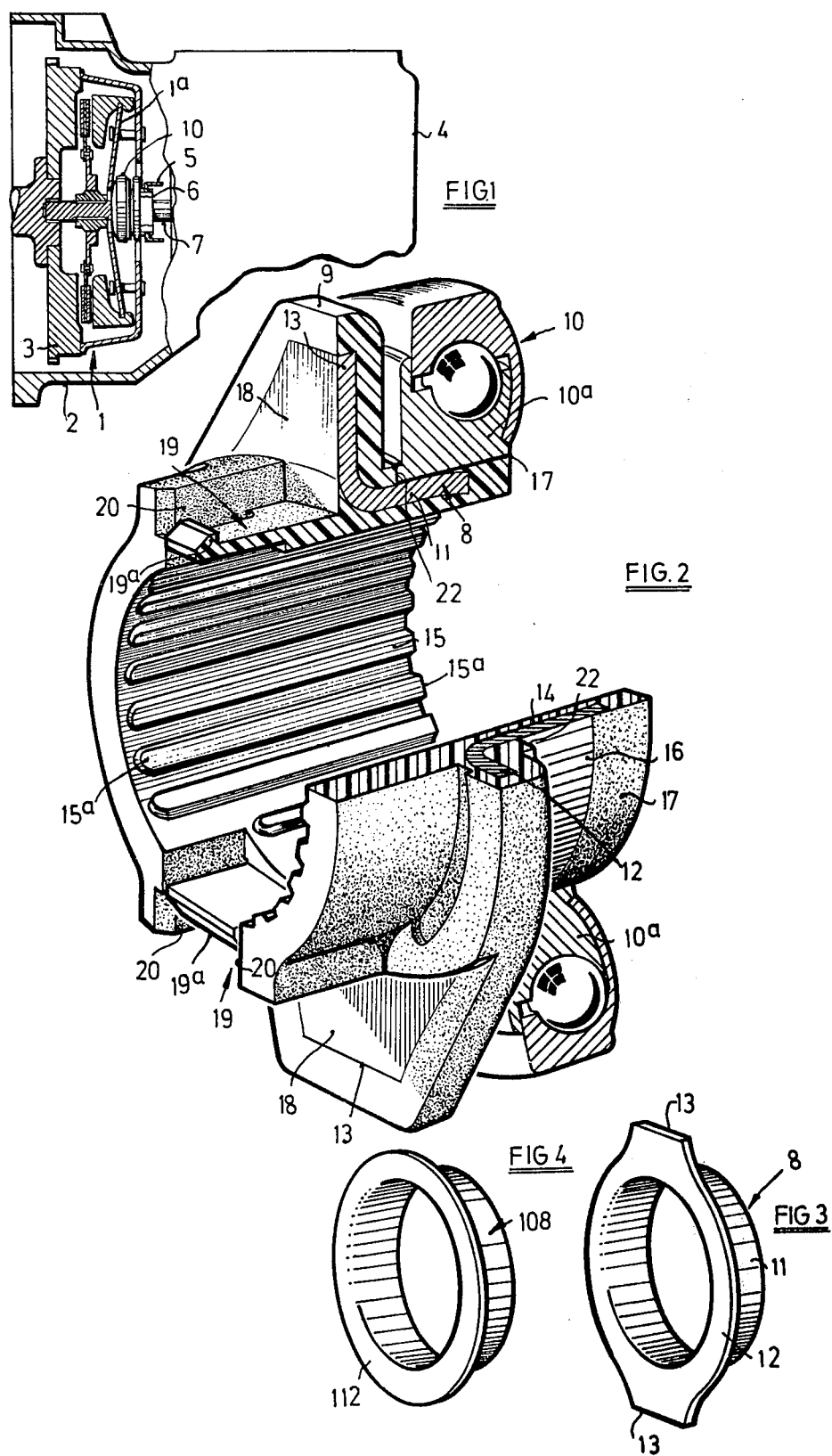

BEARING CARRIER FOR A CLUTCH RELEASE BEARING

BACKGROUND OF THE INVENTION

Field of the Invention

This invention relates to a bearing carrier for use in a clutch release bearing assembly of the type, hereinafter referred to as the type described, comprising a clutch release bearing having inner and outer races with rolling elements therebetween, the inner race being carried on the bearing carrier which is slidably mounted on a drive element of the clutch and is engaged by a clutch control member whereby a clutch disengaging force is applied to the inner race and transmitted therefrom by the rolling elements, to the outer race and hence to the clutch mechanism.

SUMMARY OF THE INVENTION

An object of the invention is to provide a new and improved bearing carrier for use in a clutch release bearing assembly of the type described.

According to one aspect of the invention we provide a bearing carrier for a clutch release bearing assembly of the type described including a metal insert and a synthetic plastics part, the metal insert comprising, a tubular portion and a flange portion, the tubular portion having on its external surface a seat portion which is adapted to engage and retain the inner race of the bearing and the bore of the tubular portion being adapted to surround a drive element of the clutch, the flange portion being adapted to provide a transverse abutment surface for engagement by the clutch operating means, the plastics part being moulded onto the insert so that relative movement between the insert and the plastic part is prevented and the plastics part providing a bearing for bearing engagement with the drive element whilst the seat portion of the insert is exposed.

Preferably the plastics part provides axial abutment surfaces for engagement by the clutch operating means.

Preferably the plastics part is provided on one surface of the flange portion to provide a transversely extending abutment surface adapted to engage a transversely extending surface of the inner race of the bearing.

The tubular portion may be of cylindrical internal and external configuration and the plastics part may extend within the bore from end to end thereof and provide a generally cylindrical bearing surface for engagement with the drive element of the clutch.

The flange portion and plastics part may combine to provide diametrically opposed channel section slots, the base of each slot being afforded by the flange portion and the opposed side walls by the plastics material, the slots being adapted to receive parts of a clutch operating member with the flange being adapted to receive the clutch operating force and the side walls to engage the clutch operating member to prevent rotation of the carrier relative thereto.

According to another aspect of the invention we provide a clutch release bearing sub-assembly comprising a clutch release bearing including inner and outer races with rolling elements therebetween, and a bearing carrier as described in the preceding paragraphs wherein the inner race of the bearing is engaged with the seat portion and is retained solely thereby on the bearing carrier.

According to a still further aspect of the invention we provide a clutch release bearing assembly of the type described wherein the bearing carrier is as described in the preceding paragraphs and the inner race of the bearing is engaged with the seat portion and is retained solely thereby on the bearing carrier.

In all of the above aspects of the invention the seat portion is of such axial extent as to provide an adequate extent of engagement within the bore of the inner race of the bearing to carry and retain the inner race on the bearing carrier. Preferably the seat portion extends through, or substantially through, the whole of the bore of the inner race.

In this specification the term "drive element of the clutch", is intended to refer to an input or output shaft of the clutch or to an element encircling such a shaft.

BRIEF DESCRIPTION OF THE DRAWINGS

The invention will now be described in more detail by way of example with reference to the accompanying drawings wherein:

FIG. 1 is a side elevation partly in section of a bearing carrier assembly embodying the invention, FIG. 2 is a perspective view partly in section of a bearing carrier sub-assembly embodying the invention, FIG. 3 is a perspective view to a reduced scale of the metal insert of the bearing carrier of FIG. 2

FIG. 4 is a perspective view of an alternative form of metal insert for use in a bearing carrier embodying the invention.

DESCRIPTION OF THE PREFERRED EMBODIMENTS

Referring to FIGS. 1 to 3 there is shown a clutch release bearing assembly comprising a conventional diaphragm friction clutch 1 in a housing 2 adapted to transmit drive between an engine fly wheel 3 and a gear box 4. The clutch is disengaged by means of a clutch operating member 5 which engages a clutch release bearing carrier 6 on which is mounted a clutch release bearing 10 engaged with the clutch diaphragm spring 1a. The carrier 6 is slidably mounted on an extension 7 of the gear box 4.

Bearing carrier 6 comprises a metal insert 8 and a covering 9 of synthetic plastics material such as nylon which is moulded around the insert 8 in conventional manner prior to assembly thereon of the clutch release bearing 10.

The insert 8 comprises a tubular portion 11 of cylindrical internal and external configuration and a radially outwardly extending flange portion 12 of a generally annular configuration but having two diametrically opposed lugs 13. The metal insert is made by blanking, piercing, drawing and trimming, in a press, sheet metal.

The plastics part 9 is moulded in a die, within which the insert is located by pins, so as to extend within the bore 14 of the metal insert 8 and beyond the ends of the insert to provide a ribbed generally cylindrical bearing surface 15 of a desired extent and of a diameter to provide a sliding fit on a drive element of the clutch, typically and as shown in the drawings, on the extension 7 of the gearbox which encircles the output shaft of the clutch. The surface 15 is provided with chamfered end portions 15a to facilitate assembly of the bearing carrier upon the clutch drive element.

The plastic provides a good bearing material and ensures that the carrier slides smoothly on the extension 7. The ribbed configuration reduces any tendency to slip-stick on the gear box extension and also assists in avoiding problems which arise when attempting to mould a plain cylindrical bore.

By moulding a different thickness of plastics material within the bore of the insert a carrier for use with different sizes of drive element may be provided without the need to provide different sizes of insert.

A part 16 the outer surface of the insert 8 is exposed and is not covered by the plastics material and provides a seat to engage and retain the inner race 10a of the bearing 10.

No plastics material is provided on the seat surface 16 because of the tendency for plastics material to creep in service, which, if plastics material were provided on the seat surface, could lead to the inner race of the bearing becoming loose on the carrier. By providing a metal-to-metal contact a good and secure fit is obtained and maintained whereby the bearing is carried and retained solely by metal to metal contact with the seat surface 16.

The seat surface 16 is of sufficient axial extent as to ensure adequate engagement between the inner race and the seat in order to support and retain the race on the bearing carrier. It is preferred that the seat extends through, or as shown in the drawings substantially through, the whole of the bore of the inner race.

At one end 17 the external cylindrical surface of the plastics part is of slightly smaller diameter than the surface 16 to facilitate assembly of the inner race of the bearing onto the bearing carrier. By moulding the plastics part 9 around the flanged end of the metal insert to provide the part 17 not only is this "guide-on" facility provided but in addition the plastics material covers any burr or roughness on the end of the insert thus avoiding the need to remove any such roughness. Moreover the roughness improves the bonding of the plastics material to the insert.

The plastics material is moulded around the majority of the flange portion 12 but is provided on only one side of the lugs 13 so that the other sides 18 of the lugs 13 are exposed. A slot 19 is formed in the plastics material centrally of each lug 13 to accommodate radially inwardly extending parts of the clutch operating member 5 so that the surface 18 of the lugs constitute an abutment surface to transmit the clutch operating force whilst the axially extending side surfaces 20 of the slots 19 engage the parts to prevent rotation of the bearing carrier relative to the member 5.

A detent 19a is provided at the outer end of each slot to retain the bearing carrier in the operating member.

By moulding the synthetic plastics material around the outer edge of the flange part 12 the connection between the plastics material and the insert is improved. If desired, in order to improve the connection between the plastics material and the insert, the, or a part of the, edges of the lugs 13 may be bent so as to extend on the same side of the lugs 13 as does the tubular part 11. These edge parts may be bent through any desired extent such as 90° or more than 90°. Alternatively, or in addition, the plastics material may be provided over the whole of the surface of the lugs 13 so that the internally extending parts of the clutch operating member 5 will act on the lugs through the covering of plastics material on one side thereof. Tests have indicated that the plastics material can bear the pressure of the operating member without excessive indentation.

By providing the slots to receive the ends of the clutch operating member with side surfaces of synthetic plastic material any rattle between the carrier and the clutch operating member is avoided. With conventional bearing carriers of metal this rattle can be a considerable problem.

The portion of the plastics part 9 which is adjacent the inner race of the bearing is provided with a radially extending abutment surface 22 for engagement by the inner race of the bearing. By providing the abutment surface 22 on the plastics part 9 there is conveniently provided a sharp corner between the abutment surface 22 and the seat surface 16. Such a corner is necessary to accommodate the inner race of the bearing 10. It is difficult, if not impossible, to provide a sufficiently sharp corner by a metal pressing technique.

In an alternative embodiment, referring to FIG. 4, the bearing carrier is of substantially the same configuration as in the previously described embodiment except for the omission of lug portions 13 from the radial flange of the metal insert. As can be seen from FIG. 4 in the embodiment the metal insert 108 has a flange portion 112 of annular shape.

In other respects the bearing carrier is as described in connection with FIGS. 1 to 3 and the plastics material is moulded around the insert in the same way as the plastics part 9 of the previously described embodiment except that the plastics material is moulded around the whole of the radial flange 112 except for diametrically opposite slots corresponding to the slots 19.

It should be appreciated that the bearing may be of any desired type such as a combined radial and thrust bearing or a simple thrust bearing. In the latter case the races in essence comprise a pair of annular members in face to face relationship with rolling elements therebetween. In the case of all bearings the term "inner race" as used herein is intended to refer to the race which is seated on the bearing carrier whilst the "outer race" is the race which is not seated on the bearing carrier, irrespective of the actual mutual juxtaposition of the races.

I claim:
1. A clutch release bearing assembly comprising:
a clutch release bearing having inner and outer races with rolling elements therebetween; and
a bearing carrier which carries the inner race and which is adapted to be slidably mounted on a drive element of a clutch and to be engaged by a clutch operating member so that a clutch disengaging force applied to the inner race is transmitted thereform, by the rolling elements, to the outer race and hence to the clutch mechanism,
the bearing carrier including a metal insert and a synthetic plastics part,
the metal insert comprising a tubular portion and a flange portion,
said flange portion providing a transverse abutment surface adapted to be engaged by the clutch operating member,
said tubular portion having an external surface on which a bearing seating surface is located and defining a bore which provides an internal surface,
the inner race of the bearing directly engaging said seating surface and being retained on the carrier solely by metal-to-metal engagement with said seating surface,
the plastics part being fixedly moulded onto the insert so that relative movement between the insert and the plastics part is prevented,
the pastics part including a tubular portion extending within said insert bore and covering the internal surface of said insert tubular portion and defining a bearing surface for bearing engagement with the clutch drive element, the plastics part also having means on the exterior thereof defining axially extending surfaces for engagement by the clutch operating member.

2. A clutch release bearing assembly according to claim 1 wherein the plastics part is provided on one surface of the flange portion to provide a transversely extending abutment surface engaging a transversely extending surface of the inner race of the bearing.

3. A clutch release bearing assembly according to claim 1 wherein the insert tubular portion is of generally cylindrical internal and external configuration.

4. A clutch release bearing assembly according to claim 3 wherein the plastics part extends within the bore from end to end thereof and provides a generally cylindrical bearing surface for engagement with the drive element of the clutch.

5. A clutch release assembly according to claim 4 wherein the generally cylindrical bearing surface is ribbed.

6. A clutch release bearing assembly according to claim 1 wherein the flange portion and plastics part combine to provide diametrically opposed channel section slots, the base of each slot being afforded by the flange portion and the opposed side walls by the plastics material, the slots receiving parts of a clutch operating member with the flange receiving the clutch operating force and the side walls engaging the clutch operating member to prevent rotation of the carrier relative thereto.

7. A clutch release bearing assembly according to claim 6 wherein a detent is formed at the end of said slots remote from the flange portion to retain the operating member on the carrier.

8. A clutch release bearing assembly comprising:
a clutch release bearing having inner and outer races with rolling elements therebetween; and
a bearing carrier which carries the inner race and which is adapted to be slidably mounted on a drive element of a clutch and to be engaged by a clutch operating member so that a clutch disengaging force applied to the inner race is transmitted therefrom, by the rolling elements, to the outer race and hence to the clutch mechanism,
the bearing carrier including a metal insert and a synthetic plastics part,
the metal insert comprising a tubular portion and a flange portion,
said flange portion providing a transverse abutment surface adapted to be engaged by the clutch operating member,
said tubular portion having an external surface on which a bearing seating surface is located and defining a bore which provides an internal surface,
the inner race of the bearing directly engaging said seating surface and being retained on the carrier solely by metal-to-metal engagement with said seating surface,
the plastics part being fixedly moulded onto the insert so that relative movement between the insert and the plastics part is prevented,
the plastics part including a first tubular portion extending within said insert bore and covering the internal surface of said insert tubular portion and defining a bearing surface for bearing engagement with the clutch drive element,
the plastics part also having a second tubular portion extending axially from said transverse abutment surface and formed with diametrically opposed slots on the exterior thereof defining axially extending surfaces for engagement by the clutch operating member,
each slot including a base in the place of said transverse abutment surface,
the slots being adapted to receive parts of the clutch operating member so that the flange portion receives the clutch operating force and the axially extending surfaces engage the clutch operating member to prevent rotation of the carrier relative thereto,
the plastics part having a detent, formed at the end of at least one of said slots at a location remote from the flange portion, to retain the clutch operating member on the carrier,
the plastics part being provided on one surface of the flange portion to provide a transversely extending abutment surface engaging a transversely extending surface of the inner race of the bearing,
the insert tubular portion being of generally cylindrical internal and external configuration, and
the bearing surface defined by said plastics part first tubular portion being ribbed and generally cylindrical.

* * * * *

UNITED STATES PATENT AND TRADEMARK OFFICE
CERTIFICATE OF CORRECTION

PATENT NO. : 4,117,916
DATED : October 3, 1978
INVENTOR(S) : Peter F. Baker

It is certified that error appears in the above-identified patent and that said Letters Patent are hereby corrected as shown below:

Col. 4, line 67 "pastics" should read --plastics--.

Col. 6, line 27 "place" should read --plane--.

Signed and Sealed this

Twenty-sixth Day of December 1978

[SEAL]

Attest:

RUTH C. MASON
*Attesting Officer*

DONALD W. BANNER
*Commissioner of Patents and Trademarks*